May 22, 1928.
T. KIPP, JR
ROTARY OATMEAL CUTTER
Filed March 1, 1924    2 Sheets-Sheet 1
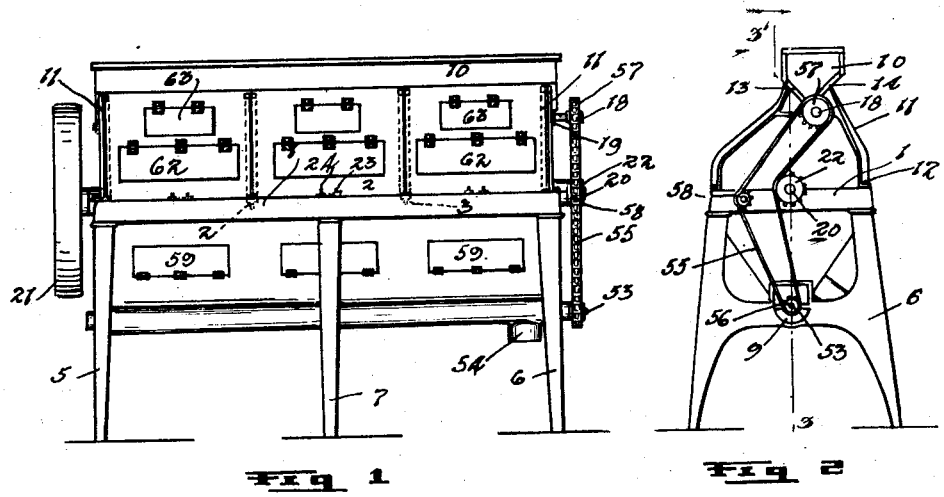
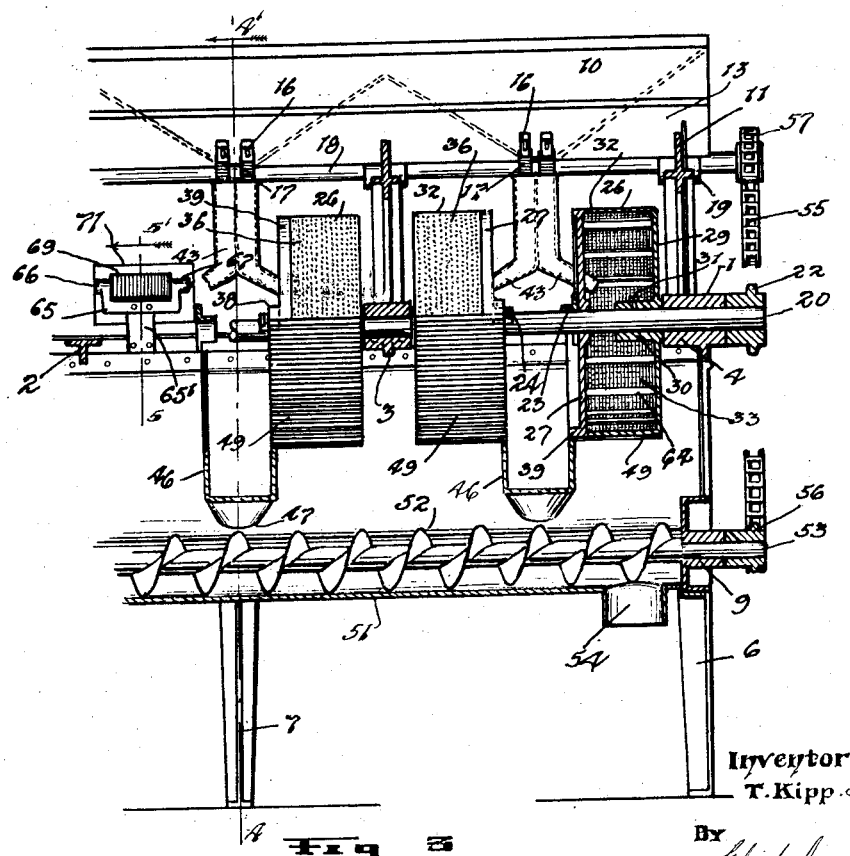
Inventor
T. Kipp Jr.

May 22, 1928.
T. KIPP, JR
ROTARY OATMEAL CUTTER
Filed March 1, 1924
1,670,812
2 Sheets-Sheet 2
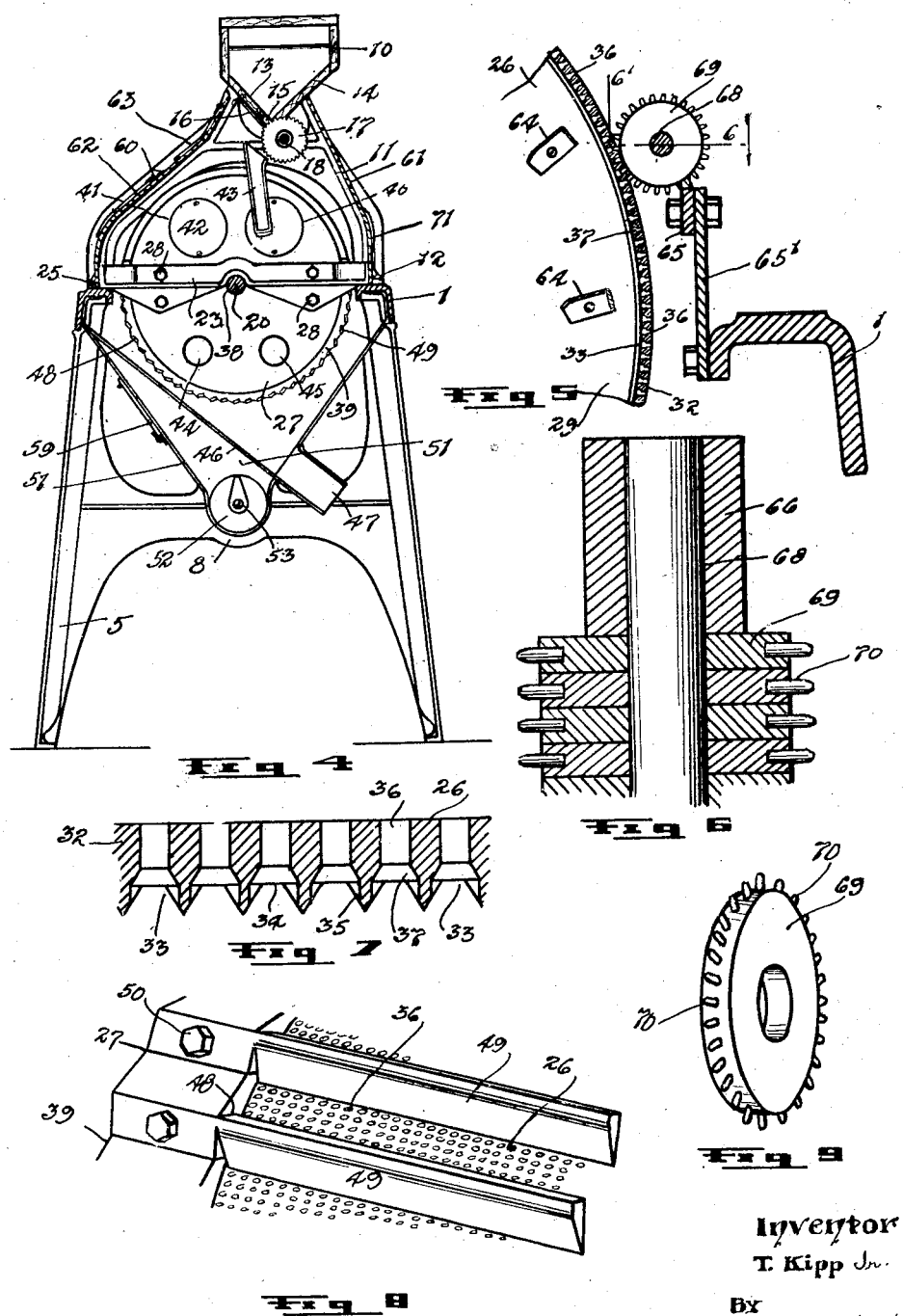

Patented May 22, 1928.

1,670,812

UNITED STATES PATENT OFFICE.

THEODORE KIPP, JR., OF WINNIPEG, MANITOBA, CANADA, ASSIGNOR TO KIPP-KELLY, LIMITED, OF WINNIPEG, MANITOBA, CANADA, A CORPORATION ORGANIZED UNDER A DOMINION CHARTER.

ROTARY OATMEAL CUTTER.

Application filed March 1, 1924, Serial No. 696,243, and in Canada February 18, 1924.

The invention relates to improvements in machines for cutting groats and an object of the invention is to provide a machine embodying a series of rotary, perforated drums into which the groats are fed, the said drums being designed so that the groats are effectively upended to pass into the perforations and a plurality of stationary cutting knives associated with each drum and adapted to cut the projecting ends of the groats as they pass through the drum perforations.

A further object of the invention is to provide a compact machine of large capacity which will effect the cutting of the groats in a minimum of time.

A further object is to provide means for maintaining the drum perforations clear so that there is no possibility of the same being clogged and further to provide an overflow or discharge from the drums should the feed become too heavy.

A further object is to provide a convenient means for regulating the feed of groats to the drums and also to supply suitable inspection doors so that all parts can be under observation.

A further object is to provide means within the rotary drum whereby the effective cutting area of the knives is increased, such means distributing the groats and causing them to pass end on through the perforations for approximately one-half the working area of the drum.

A further and more specific object is to provide a rotating drum having the interior thereof circumferentially corrugated, perforations or holes passing through the drum from the bottoms of the corrugations and with the inner ends of the holes countersunk, such structure resulting in the efficient directing and upending of the groats into the holes end on.

With the above more important objects in view the invention consists essentially in the arrangement and construction of parts hereinafter more particularly described, reference being had to the accompanying drawings in which:

Fig. 1 is a front view of the complete machine.

Fig. 2 is an end view thereof.

Fig. 3 is an enlarged longitudinal vertical sectional view at 3—3′ through one cutting unit and showing adjoining units in side elevation.

Fig. 4 is an enlarged cross sectional view at 4—4′ Figure 3.

Fig. 5 is an enlarged sectional view at 5—5′ Figure 3.

Fig. 6 is an enlarged horizontal sectional view through a part of the cleaner.

Fig. 7 is an enlarged sectional view through a portion of the drum and showing the ribs, holes and countersinks.

Fig. 8 is a perspective view of a portion of the drum showing the manner in which the cutting knives are attached thereto.

Fig. 9 is a perspective view of one of the disc like cleaners.

In the drawings like characters of reference indicate corresponding parts in the several figures.

The main frame 1 of the machine is substantially rectangular and it is provided with two cross supports 2 and 3 and the ends of the frame, as well as the supports, are provided with centrally positioned axially aligned bearings 4. The ends of the frame are supported by similar end legs 5 and 6 and a centrally positioned pair of legs 7. The end legs are connected and carry centrally positioned elevated bearings 8 and 9.

The hopper or feed box 10 of the machine is carried by similar suitably spaced end and intermediate brackets 11, these brackets being firmly bolted as indicated at 12 to the frame and having their upper ends shaped to receive and support the converging bottom boards 13 and 14 of the feed box.

As the present machine embodies six drums, a feed box is provided with three hoppers, one hopper feeding two drums. The feed opening 15 from each hopper is controlled by adjustable sliding gates 16 and the gate in each instance can be moved towards or away from a feeding roller 17 which has the face thereof lengthwise corrugated, the corrugations being adapted to receive the groats as they feed from the hopper.

The rollers are all carried by, what I will call, the feeding shaft 18 which has the ends thereof mounted in suitable bearings 19 carried by the brackets 11.

The bearings 4 support rotatably, the drive shaft 20 which is provided at one end with a driving pulley 21 and the other end with a chain wheel 22. Midway between the adjacent bearings 4 I locate similar pairs of spaced cross arms 23 and 24, the cross arms having their ends permanently fastened at 25 to the frame 1 and the central portions thereof turned upwardly or arched to span the shaft 20.

On the shaft 20 I mount, in the present instance, six similar drums 26 which rotate therewith and each drum has one end closed and the other end open. The open end of each drum is closed by a stationary disc like head 27 which is permanently fastened as by bolts 28 to the cross arm 23 or 24 as the case may be. Here it will be observed that the stationary heads appear in spaced pairs with their inner faces opposing and their outer faces making sliding contact with the open ends of the drum cylinders. In this way I provide a convenient arrangement for feeding the groats to the adjacent drums by passing the feed tubes between the heads from the feed box. As the drums and stationary disc like heads are all identical I will now describe one drum and one head in detail.

The drum has one end 29 closed and provided with a hub 30 fastened by a set screw 31 to the shaft 20 and the said closed end carries a cylindrical shell 32 of pre-determined diameter and length, the extending end of which is open. Interiorly the shell is circumferentially corrugated as indicated at 33 to provide similar channels 34 separated by V-shaped ribs 35.

In the base of each channel I drill a plurality of equi and suitably spaced holes 36 and after having drilled the holes I countersink or enlarge the inner end of each hole as indicated at 37. The holes are of a size such that they will allow a groat to pass therethrough end on and the channels and countersinks coact to effectively aline the groats and upend them into the holes when the machine is working.

The stationary disc like head which is provided to close the end of the drum shell, is provided with a central bearing 38 through which the shaft 20 passes and with a marginal flange 39 extending away from the end of the drum shell and has the underside thereof somewhat wider than the upper part. A feed opening 40 and a hand opening 41 are provided in the upper part of the stationary head, the hand opening being closed by a removable gate 42 and the feed opening receiving the lower end of a feed tube 43 leading down from the feed box and opening to the interior of the drum. Two further overflow holes 44 and 45 are provided in the lower part of each head which allow the groats to escape out from the drum, should the feed become too heavy.

A collecting pan 46 is adapted to receive the groats overflowing through the openings 44 and 45 from each adjoining pair of drums and each pan discharges through a suitable outlet opening 47 provided at the back of the machine.

The enlarged or wide part of the flange 39 of each stationary head, is cross slotted as indicated at 48 to provide a plurality of equi-spaced sockets which receive snugly, the ends of the knives 49, the said ends of the knives being firmly fastened to the flange by a screw 50. The knives extend from the stationary head and operate over the outer face of the rotating drum, with the result that as the groats slide through the drum openings they are cut by the knives, each groat being cut several times as the knives follow closely one after another. The cut groats are adapted to fall down into a collecting pan 51, this pan really enclosing the bottom part of the machine and having a worm 52 operating in the lower part thereof, the worm being carried by the worm shaft 53 which is mounted in the bearings 8 and 9. The worm is adapted to deliver the oatmeal to the discharge spout 54 and the shaft 53 is driven by an endless chain 55 operating over a chain wheel 56 secured to said shaft, said chain also passing over the chain wheel 22 and the chain wheel 57 secured to the shafts 18 respectively. An idler wheel 58 is attached to one end of the frame and carries one side of the chain.

Suitable inspection doors 59 are provided on the receiving pan and the open space between the feed box and the main frame is covered by front and back plates 60 and 61 which enclose the drums. The front plate is provided with inspection doors 62 which permit one to inspect the drums, and it is also provided with upper inspection doors 63 through which one adjusts the feed gates.

The closed end 29 of the drum carries a plurality of suitably spaced horizontally extending cups 64 which extend approximately the full length of the drum and are positioned so that they just nicely clear, say by approximately one-quarter of an inch, the interior face of the drum. These cups are in cross section of the shape best shown in Figure 5.

Rearwardly behind each drum I locate, what I call, a cleaner. Each cleaner comprises a bracket 65 which presents two horizontally disposed end bearings 66 and 67 which receive a comparatively short shaft 68. On the shaft I mount rotatably, a plurality of similar comparatively thin wheels 69, the number of the wheels corresponding to the number of channels formed in the drum and each wheel is provided with a plurality of radiating pins or teeth 70 having their outer ends somewhat tapered or pointed. The pins are spaced and the wheels are located in respect to the holes in the drum, such that as the drum rotates, the teeth will enter the drum holes, with the result that all the holes of the drum are kept constantly clean by the cleaning action of the teeth. The wheels are permitted a slight end shifting on the shaft 68 and by so doing I permit them to accommodate themselves to any slight irregularity which might occur in the drilling of the drum holes. The tapering tips of the pins act to direct them into the holes. The bracket 65 is supported in each instance by a spring arm 65' fastened to the bracket and to the machine frame. This arm also acts to cushion the cleaners as it will spring out and in to accommodate the drum face. Suitable back doors 71 are provided to allow one to inspect the cleaners.

The machine is driven by a driving belt applied to the pulley 22 and the shaft 20 drives the worm and the feed rollers through the chain 55. The drums rotate the cleaners, the attendant sets the feed controlling gates as experience dictates and the groats are fed to the interior of the drums through the feed tubes by the feed rollers. As the machine rotates, the channels of the drums effectively act to turn the groats next the interior face of the drum, in the direction of the channels so that they will, in their sliding movement within the drum, move end on towards the holes. As they reach the holes, the countersinks cause them to up end and go end on through the openings.

There is a natural tendency, in a rotary machine of this kind, for the groats to ride up one side of the drum so that the full working area of the under half of the drum is not in use. I, however, counteract this tendency by utilizing the cups which, in the rotation of the drum, positively catch the grain and throw it over and distribute it on to that side of the drum which would otherwise have a tendency to be unloaded or working at small capacity. With my machine practically the full under half of the drum is working and groats are being expelled through all the holes on the under half of the drum and are being cut by the knives.

In order to fully appreciate the value of certain parts of this machine I might mention that I have found by experimenting, that by adding the countersinks to the holes I increase the efficiency of a machine 100 per cent and that the addition of the circumferentidly directed channels gives a further efficiency over a machine simply having holes and countersinks.

Whilst I have shown a particular type of feed hopper and means for feeding the grain into the drums, still it will be readily understood that I do not wish to be limited to any such shown arrangement as the invention relates more particularly to the manner in which the groats are handled within the drum and cut.

The knives are positioned angularly in respect to the drum, this being accomplished by making the bases of the slots or sockets 48 in an angular position. These slots also prevent any rotary tendency of the knives around their fastening screws. All the knives are interchangeable and the whole arrangement is such that they can be readily removed for sharpening or replacement purposes.

What I claim as my invention is:

1. In a machine for cutting groats, a horizontally disposed rotating groat receiving drum interiorly corrugated, the corrugations passing in a direction around the drum and receiving the groats sliding endwise therein under the action of gravity and having perforations formed in the corrugations and of such a size that they permit of the passage through the drum of the sliding groats end on and exterior means for cutting the groats as they pass through the perforations.

2. In a machine for cutting groats, a horizontally disposed rotating groat receiving drum interiorly corrugated, the corrugations passing in a direction around the drum and receiving the groats sliding endwise therein under the action of gravity and having perforations formed in the corrugations and of such a size that they permit of the passage through the drum of the sliding groats end on and each perforation having the inner end thereof counter sunk and exterior means for cutting the groats as they pass through the perforations.

3. In a groat cutting machine, a rotating horizontally disposed cylindrical drum adapted to receive the groats and interiorly and circumferentially corrugated to provide tracks in which the groats slide end on under the influence of gravity in the rotation of the drum and having perforations formed in the bases of the corrugations and passing through the drum for deflecting the sliding groats and through which the groats escape end on.

4. In a groat cutting machine, a rotating horizontally disposed cylindrical drum adapted to receive the groats and provided with interior circumferentially directed channels throughout its length, the channels having converging sides in which the groats slide under the influence of gravity and provided at the bottoms of the channels with perforations passing through the drum shell and adapted to permit the escape from the drum end on of the sliding groats.

5. In a groat cutting machine, a rotating horizontally disposed cylindrical drum adapted to receive the groats and provided with interior circumferentially directed channels throughout its length, the channels having converging sides in which the groats slide under the influence of gravity and provided at the bottoms of the channels with perforations passing through the drum shell and adapted to permit the escape from the drum end on of the sliding groats and having the inner ends of the perforations counter sunk.

6. In a groat cutting machine, a rotating horizontally disposed cylindrical drum adapted to receive the groats and having a continuous series of interior circumferentially directed V-shaped channels formed on the inner side of the drum shell throughout the length thereof in which the groats slide end on under the action of gravity and during the rotation of the drum and provided further with suitably spaced perforations passing through the drum from the bases of the channels, the inner ends of the perforations being counter sunk and adapted to deflect the sliding groats into the perforations end on.

7. In a groat cutting machine, a rotatably mounted, cylindrical drum having one end closed and the other end open and having the shell thereof perforated, the perforations being formed in the bases of interior circumferentially directed channels provided on the inner side of the drum and all of said perforations having their inner ends countersunk, a stationary head closing the open end of the drum, means for feeding the groats into the drum through the stationary head and a plurality of suitably spaced cutting knives operating on the outer face of the drum and carried by the stationary head.

Signed at Winnipeg, this 29th day of December, 1923.

THEODORE KIPP, Jr.